United States Patent [19]
Iwai et al.

[11] Patent Number: 5,331,532
[45] Date of Patent: Jul. 19, 1994

[54] HIGH VOLTAGE REGULATING CIRCUIT

[75] Inventors: Kenji Iwai; Seiji Kawaberi, both of Kanagawa; Akihiro Ueyama, Tokyo; Junzo Watanabe, Kanagawa, all of Japan

[73] Assignee: Sony Corporation, Tokyo, Japan

[21] Appl. No.: 888,497

[22] Filed: May 27, 1992

[30] Foreign Application Priority Data

May 30, 1991 [JP] Japan .................. 3-155856

[51] Int. Cl.$^5$ ............................ H02M 3/335
[52] U.S. Cl. .................... 363/20; 363/21; 315/411; 348/730
[58] Field of Search ........... 363/20, 18, 19, 56, 363/131, 21, 49; 315/194, 209 R, 291, 411; 358/190

[56] References Cited

U.S. PATENT DOCUMENTS

| | | | |
|---|---|---|---|
| 4,546,388 | 10/1985 | Williams, Jr. .................... 358/190 |
| 4,704,674 | 11/1987 | Maehara et al. ................. 363/131 |
| 4,728,868 | 3/1988 | Ishikawa et al. ............. 358/190 X |
| 4,891,707 | 1/1990 | Dieterle et al. .................. 358/190 |
| 4,939,429 | 7/1990 | Rodriguez-Cavazos ........... 315/411 |
| 5,126,930 | 6/1992 | Ahn ................................. 363/21 |
| 5,184,289 | 2/1993 | Bonnet et al. .................... 363/20 |
| 5,276,604 | 1/1994 | Messman ......................... 363/65 |

FOREIGN PATENT DOCUMENTS 0196073 10/1975 Japan .................. 358/190

Primary Examiner—Steven L. Stephan
Assistant Examiner—Adolf Berhane
Attorney, Agent, or Firm—Lewis H. Eslinger; Jay H. Maioli

[57] ABSTRACT

A coil (11) is connected in series to a primary winding (1a) of a flyback transformer (1). A series circuit of a capacitor (15) and a switching circuit (12) is connected in parallel to the coil (11). By turning on and off the switching circuit (12), the connection of the capacitor (15) to the coil (11) is switched, to thereby connect or disconnect the coil (11) in an AC fashion. Therefore, it is possible to realize a high voltage regulating circuit which can be made inexpensive.

9 Claims, 12 Drawing Sheets

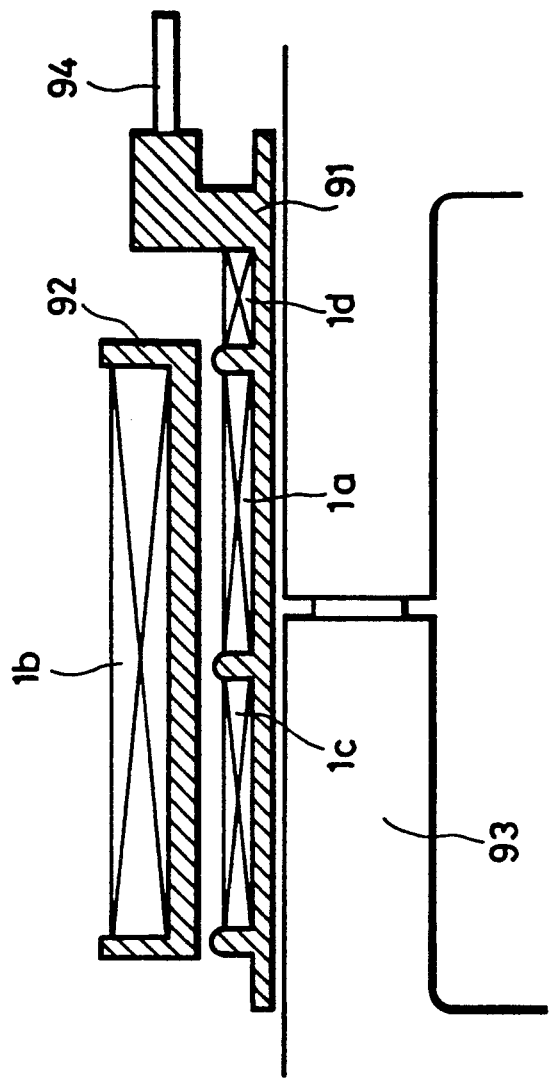

HIGH VOLTAGE REGULATING CIRCUIT

BACKGROUND OF THE INVENTION

1. Field of the Invention

The present invention relates to high voltage regulating circuits and, more particularly, to a high voltage regulating circuit for use in regulating a high voltage supplied to a cathode ray tube (CRT) of a television receiver or the like, for example.

2. Description of the Related Art

High voltages of from 25 kV to 28 kV must be applied to an anode of the CRT of the television receiver. Such high voltage is generally generated by a flyback transformer and must be controlled so as not to fluctuate because the high voltage fluctuation changes the size of raster or the focusing.

To regulate or stabilize the high voltage, the following two methods are known in the art:

In a first method which is known as a power source voltage modulation method, a high voltage output is detected and a high voltage is regulated by changing the power source voltage. In a second method which is known as a pulse width modulation method, a high voltage output is detected and a high voltage is regulated to be constant by changing the pulse width (pulse width of retrace).

Further, it is proposed to couple a second flyback transformer (flyback transformer for control) to the secondary side of the flyback transformer.

The above-mentioned two conventional methods are sufficient for stabilizing or regulating the high voltage. However, a tertiary output voltage of about 15 V to 200 V derived from the flyback transformer and the retrace pulse width in order to control the high voltage are fluctuated so that the television receiver must require a so-called separate system in which a horizontal deflection circuit and a high voltage generating circuit are separated and spaced apart or in substantially the same as the separate system.

Further, in the method of coupling the second flyback transformer to the secondary side of the flyback transformer, if a focusing voltage is obtained from an intermediate point of a high voltage coil, then this voltage is fluctuated due to the high voltage control. As a result, such fluctuated voltage cannot be used as the focusing voltage. Furthermore, the two flyback transformers are used, which unavoidably provides an expensive high voltage regulating circuit.

In addition, since these conventional methods are to primarily control the input voltage waveform itself of the primary winding of the flyback transformer, a large electric power portion (large current and large voltage) including the horizontal deflection circuit must be controlled, which needs the assembly parts of large capacity. From this standpoint, the conventional high voltage regulating circuit becomes expensive.

OBJECTS AND SUMMARY OF THE INVENTION

Therefore, it is an object of the present invention to provide an improved high voltage regulating circuit in which the aforesaid shortcomings and disadvantages encountered with the prior art can be eliminated.

More specifically, it is an object of the present invention to provide a high voltage regulating circuit which can be simplified in arrangement.

Another object of the present invention is to provide a high voltage regulating circuit which can be made inexpensive.

Still another object of the present invention is to provide a high voltage regulating circuit which can stabilize a high voltage.

A further object of the present invention is to provide a high voltage regulating circuit which need not be formed as a separate system or a system substantially equal to the separate system.

Yet a further object of the present invention is to provide a high voltage regulating circuit in which a focusing voltage can be generated from a secondary coil of a flyback transformer.

Still a further object of the present invention is to provide a high voltage regulating circuit which a fluctuation of a voltage in a tertiary winding is small.

As an aspect of the present invention, a high voltage regulating circuit is comprised of a flyback transformer in which a high voltage output corresponding to a voltage input to the primary winding is generated from a secondary winding, an inductance inserted into the primary winding of the flyback transformer in series, and a series circuit of a capacitor and a switching element connected in parallel to the inductance.

In the high voltage regulating circuit thus arranged, an inductance is equivalently coupled to the primary winding of the flyback transformer and the connected state of the inductance is controlled in response to the output voltage. Therefore, it is possible to realize the high voltage regulating circuit of simple arrangement which can made inexpensive.

BRIEF DESCRIPTION OF THE DRAWINGS

A better understanding of other objects, features, and advantages of the present invention can be gained from a consideration of the following detailed description of illustrative embodiments thereof, in conjunction with the figures of the accompanying drawings in which:

FIG. 10 is a fragmentary cross-sectional view illustrating a configuration of cross section of a flyback transformer to which the third embodiment of FIG. 9 is applied;

DETAILED DESCRIPTION OF THE PREFERRED EMBODIMENTS

The present invention will now be described in detail with reference to the drawings.

Figure 1:
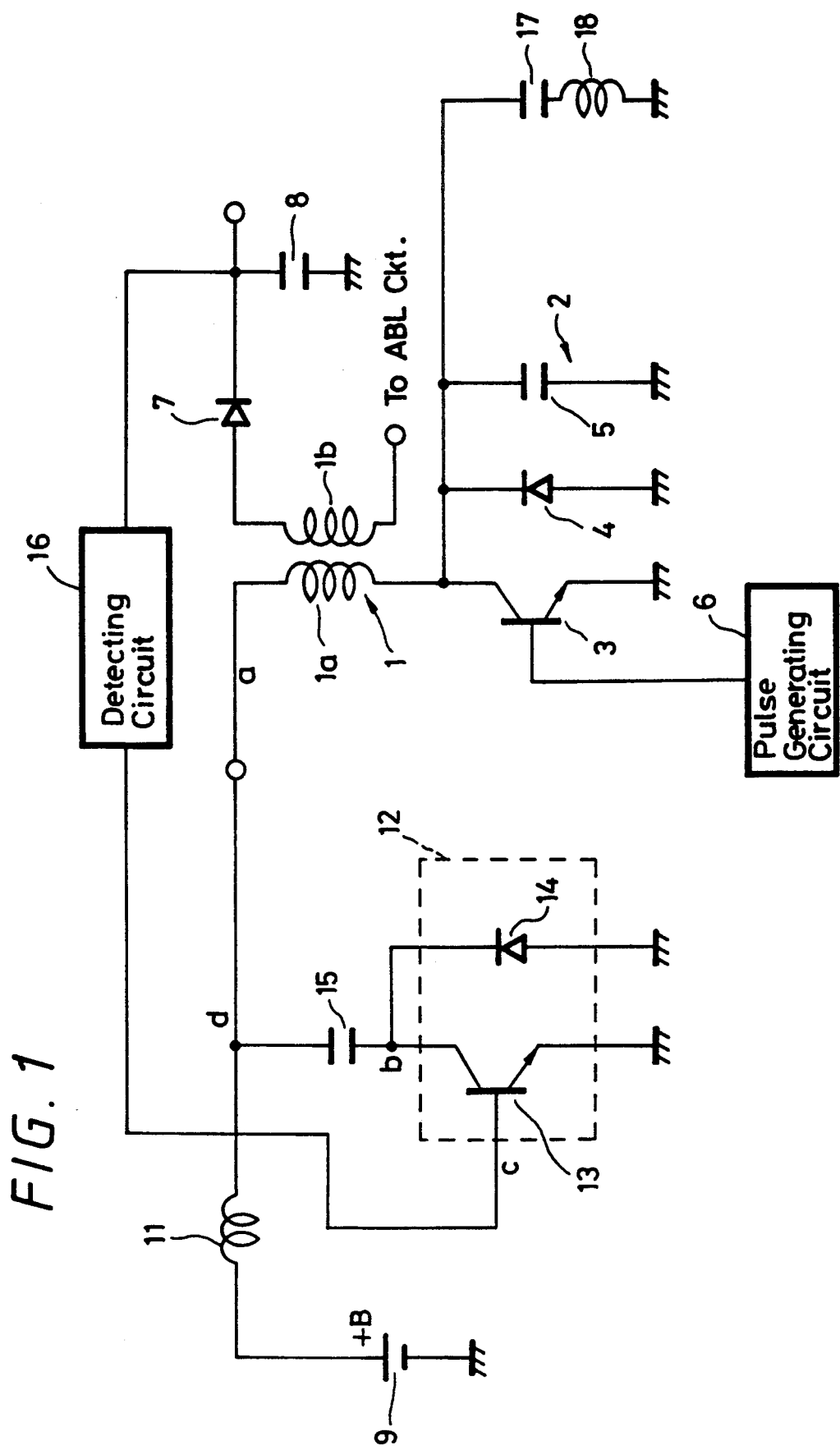
FIG. 1 is a diagram showing a circuitry of a first embodiment of a high voltage regulating circuit according to the present invention.

FIG. 1 of the accompanying drawings shows a circuitry of a first embodiment of a high voltage regulating circuit according to the present invention.

Referring to FIG. 1, a switching circuit 2 composed of an NPN transistor 3, a diode 4 and a capacitor 5 operates to output a horizontal deflection pulse in synchronism with a pulse generated from a pulse generator circuit 6. The horizontal deflection pulse from the switching circuit 2 is supplied through a capacitor 17 to a horizontal deflection yoke 18.

The horizontal deflection pulse from the switching circuit 2 is also supplied to a primary winding 1a of a flyback transformer 1. A high voltage is generated from a secondary winding 1b of the flyback transformer 1 and this high voltage is rectified by a diode 7 and smoothed by a capacitor 8, which then is output.

In accordance with the first embodiment of the present invention, an external inductance coil 11 is connected in series to the primary winding 1a of the flyback transformer 1 and a DC voltage output from a battery 9 is supplied through the external impedance coil 11 to the primary winding 1a of the flyback transformer 1.

The external impedance coil 11 is coupled with a series circuit of a capacitor 15 and a switching circuit 12. The switching circuit 12 comprises a parallel circuit of an NPN transistor 13 and a diode 14. The NPN transistor 13 is switched by an output of a detector circuit 16.

Operation of the first embodiment of the high voltage regulating circuit according to the present invention will be described with reference to FIGS. 2A through 2D forming waveform diagrams.

The pulse generator circuit 6 generates a pulse synchronized with the horizontal scanning cycle to thereby turn on and off the NPN transistor 3, whereby the switching circuit 2 is permitted to generate a horizontal deflection pulse. This horizontal deflection pulse is supplied through the capacitor 17 to the horizontal deflection yoke 18, thereby a horizontal deflection current of a sawtooth waveform being flowed through the horizontal deflection yoke 18. As a consequence, the electron beam in the CRT (not shown) is scanned in the horizontal direction.

The horizontal deflection pulse generated by the switching circuit 2 is also applied to the primary winding 1a of the flyback transformer 1, whereby a high voltage is induced in the secondary winding 1b of the flyback transformer 1. The resultant high voltage is rectified by the diode 7, smoothed by the capacitor 8 and then is output.

One end of the secondary coil 1b is coupled to an automatic brightness limiting (ABL) circuit, whereat a current flowing through the secondary winding 1b of the flyback transformer 1 is detected. Then, this current is controlled so as not to exceed a predetermined value by the ABL circuit.

An output current is flowed through the secondary winding 1b of the flyback transformer 1 because the diode 7 is turned on when the voltage across the secondary winding 1b of the flyback transformer 1 exceeds a charging voltage of the capacitor 8. When the charging voltage of the capacitor 8 is larger than the voltage across the secondary winding 1b, the diode 7 is turned off, thereby inhibiting the current from being flowed through the secondary winding 1b. That is, a pulse-shaped current is flowed through the secondary winding 1b.

Figure 2A:
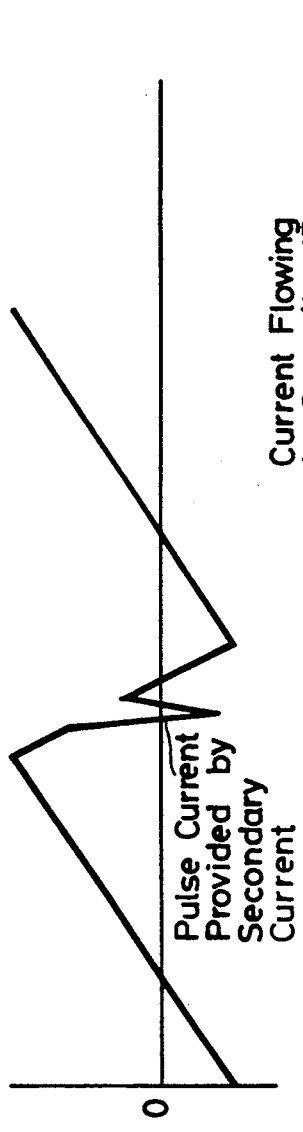
FIGS. 2A through 2D are respectively waveform diagrams used to explain operation of the first embodiment of FIG. 1.

On the other hand, the current flowing through the primary winding 1a of the flyback transformer 1 becomes a sawtooth wave synchronized with the horizontal deflection pulse output from the switching circuit 2 as shown in FIG. 2A. However, if the current of the pulse waveform is flowed through the secondary winding 1b, then the effect thereof resultantly appears in the primary winding 1a so that the current of pulse waveform is flowed through the primary winding 1a during the retrace interval (see FIG. 2A).

Figure 2B:
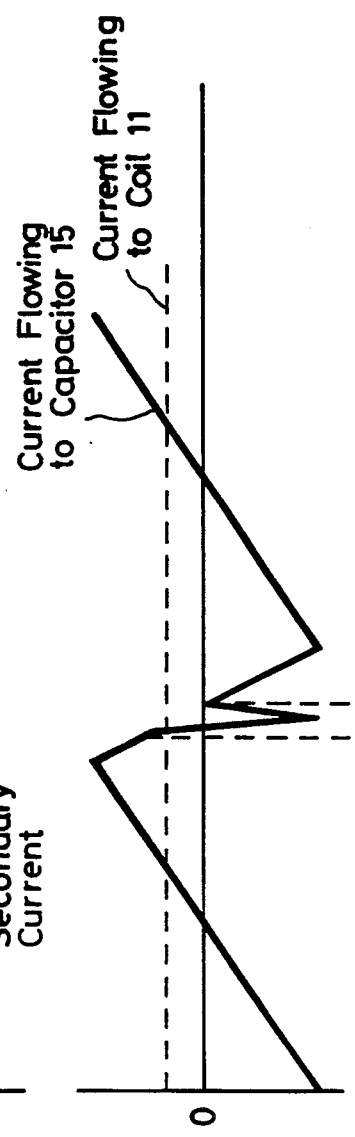

If now the NPN transistor 13 is in its on state, then of the current flowing through the primary winding 1a, a DC component thereof is flowed through the coil 11 and the AC component thereof is flowed through the capacitor 15 so that these currents are changed as shown in FIG. 2B. In FIG. 2B, a dashed line represents the current flowing through the coil 11 and a solid line represents the current flowing through the capacitor 15. Of the currents flowing through the capacitor 15, a positive current is flowed through the diode 14 while the negative current is flowed through the collector-emitter path of the NPN transistor 13.

Figure 2C:
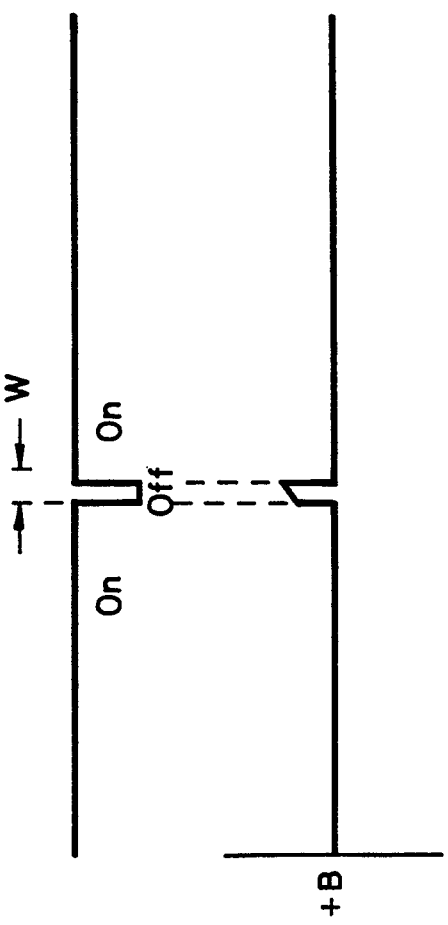
Figure 2D:

Let it now be considered that the NPN transistor 13 is turned off during one interval of the retrace period as shown in FIG. 2C. If the NPN transistor 13 is turned off, then the current is flowed through the diode 14 because the current is the positive current before it becomes the pulse current. However, the current is inverted to the negative direction just after the pulse current is started so that the diode 14 is turned off. Then, since the NPN transistor 13 also is now in its off state, the circuit is opened in an AC fashion, thereby a pulse voltage shown in FIG. 2D being generated in the primary winding 1a of the flyback transformer 1. This pulse voltage acts to reduce a height (height of pulse in the event that the switching circuit 2 is operated) of the pulse generated in the primary winding 1a of the flyback transformer 1. As a consequence, the high voltage output as an output voltage is lowered.

Accordingly, if the high output voltage (voltage across the capacitor 8) is detected by the detector circuit 16 and a time ratio between the on and off of the NPN transistor 13 is controlled within a range of the width W (see FIG. 2B) of the pulse current based on the secondary current in response to the detected voltage, then the high voltage output can be controlled so as to become constant.

Figure 3:
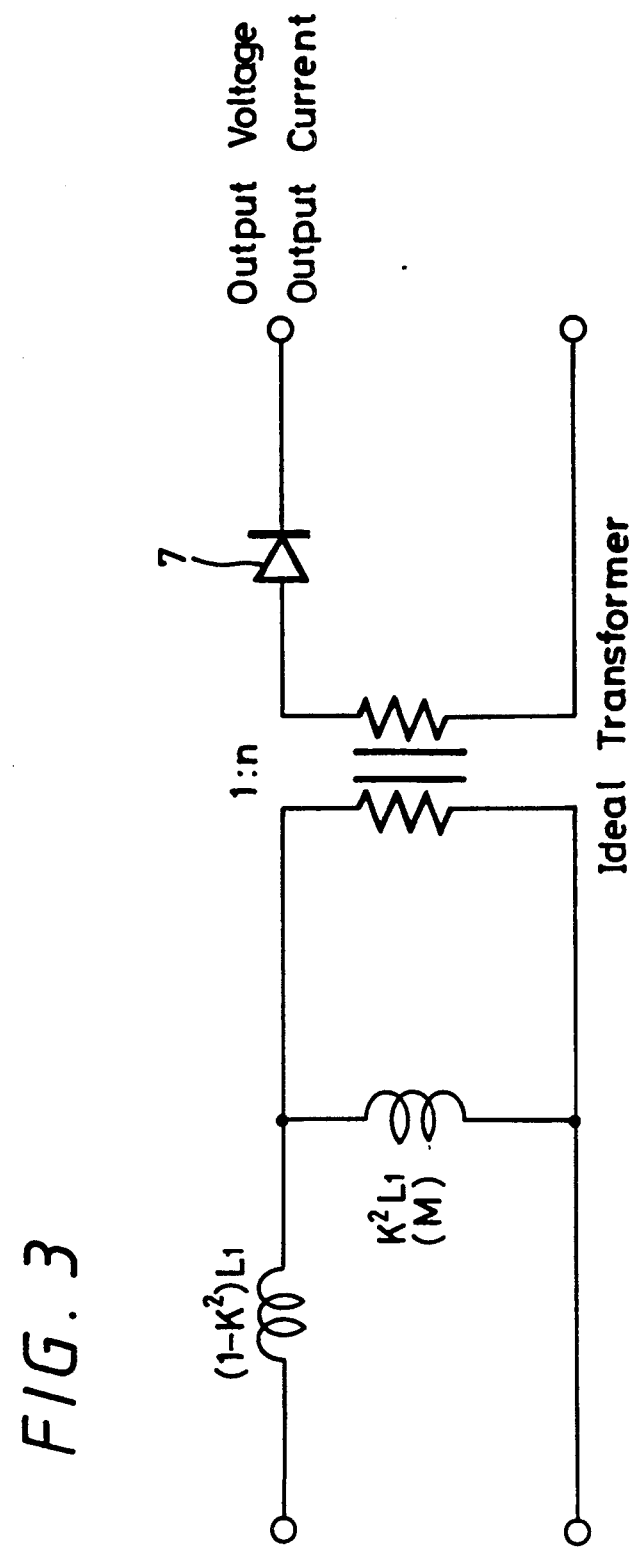
FIG. 3 is a diagram showing an equivalent circuit of the flyback transformer utilized in FIG. 1.
Figure 4:
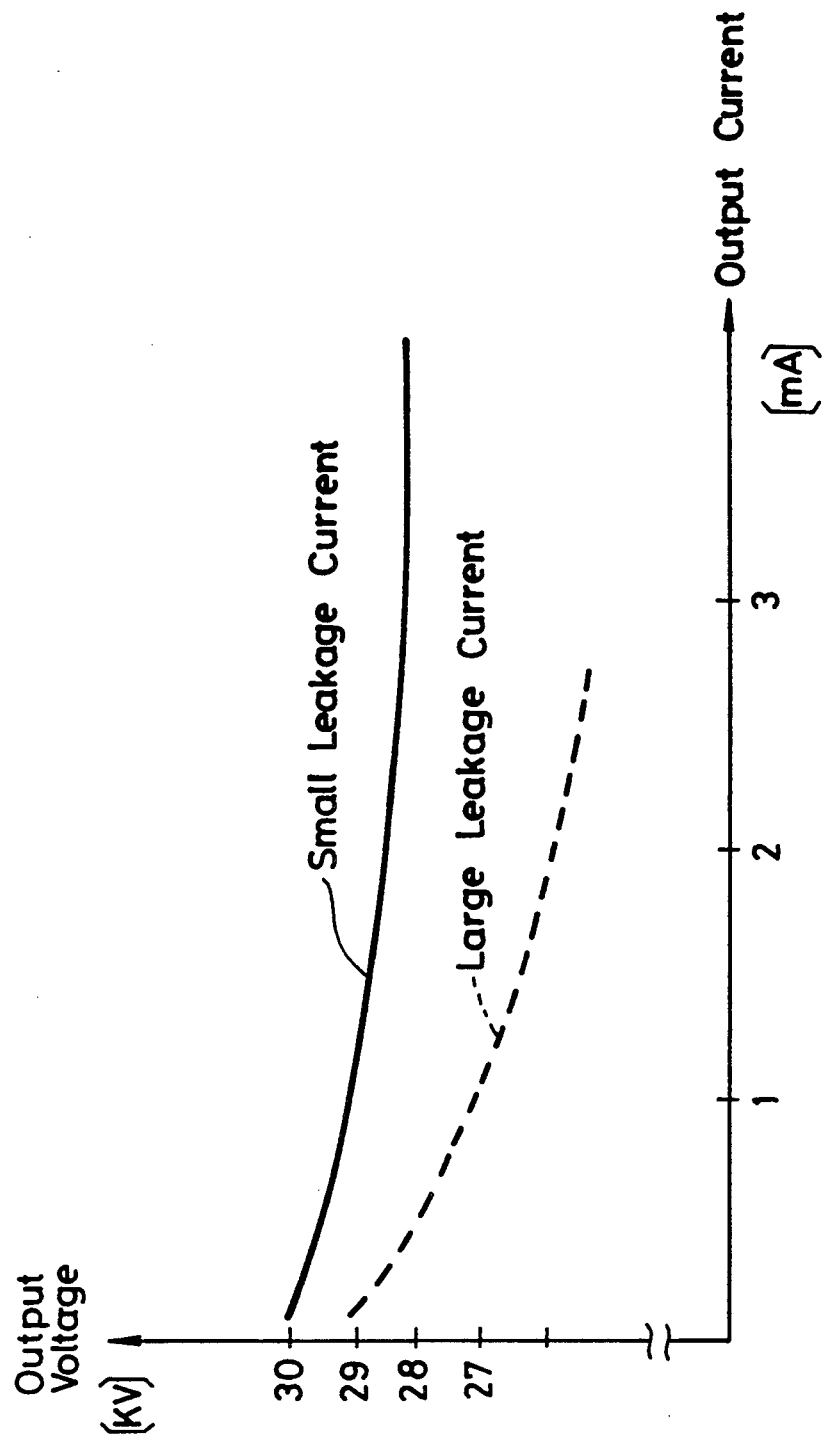
FIG. 4 is a characteristic graph graphing an output impedance in the equivalent circuit shown in FIG. 3.

An equivalent circuit of the flyback transformer 1 is illustrated in FIG. 3. In FIG. 3, M ($=k^2 L1$) represents a mutual inductance and $(1-k^2)L1$ represents a leakage inductance. Characteristics of the output impedance of the flyback transformer 1 are illustrated, for example, in FIG. 4. Study of FIG. 4 demonstrates that, if the leakage inductance is small, then the output impedance is small. Accordingly, a ratio in which the output voltage is changed is small, even if the output current is changed. If on the other hand the leakage inductance becomes large, then the output impedance becomes larger, thereby a ratio in which the output voltage is changed relative to the change of the output current is increased. Therefore, it is generally desirable that this leakage current is smaller.

Figure 5:
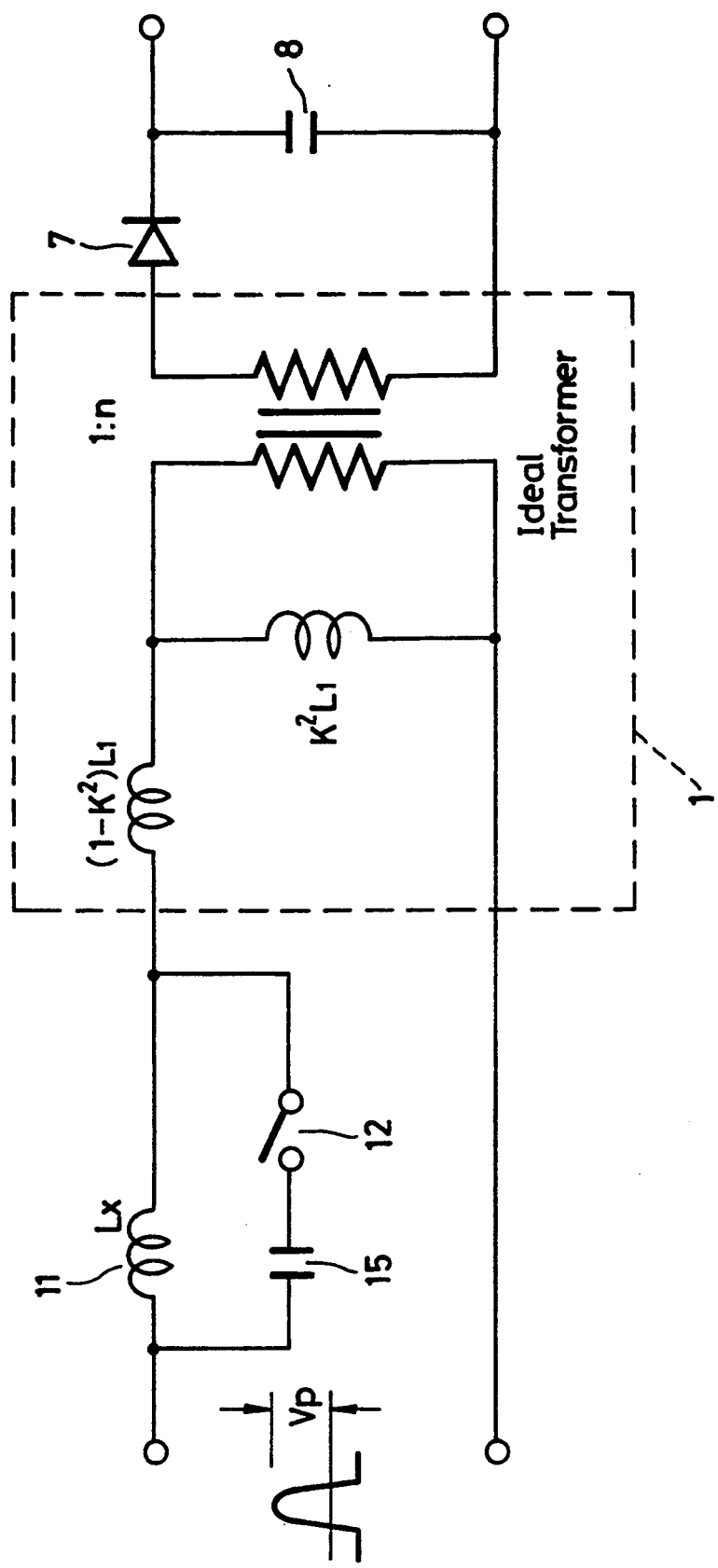
FIG. 5 is a diagram showing an equivalent circuit of a main portion of the first embodiment shown in FIG. 1.

However, the fact that the external coil 11 is coupled in series to the primary winding 1a of the flyback transformer 1 as shown in FIG. 1 unavoidably increases the leakage inductance. More specifically, an equivalent circuit of the main portion of the circuitry shown in FIG. 1 is illustrated in FIG. 5. As shown in FIG. 5, an inductance Lx based on the coil 11 is coupled to the leakage inductance $(L-k^2)L1$ in series and a series circuit of the capacitor 15 and the switching circuit 12 is connected in parallel to the inductance Lx.

The fact that the NPN transistor 13 in the switching circuit 12 is turned on means that the capacitor 15 is connected in parallel to the inductance Lx. Also, the fact that the switching circuit 12 is turned off means that the connection of the capacitor 15 to the inductance Lx is released. When the capacitor 15 is coupled in parallel to the inductance Lx, the inductance lx is short-circuited in an AC standpoint. That is, the connection of the coil 11 to the primary winding 1a is released in an AC fashion. When on the other hand the switching circuit 12 is turned off, this means the state such that the coil 11 is coupled to the primary winding 1a in series.

The capacitor 15 operates to block a DC loop current from being flowed through the loop of the inductance Lx, the switching circuit 12 and the inductance Lx.

Figure 6:
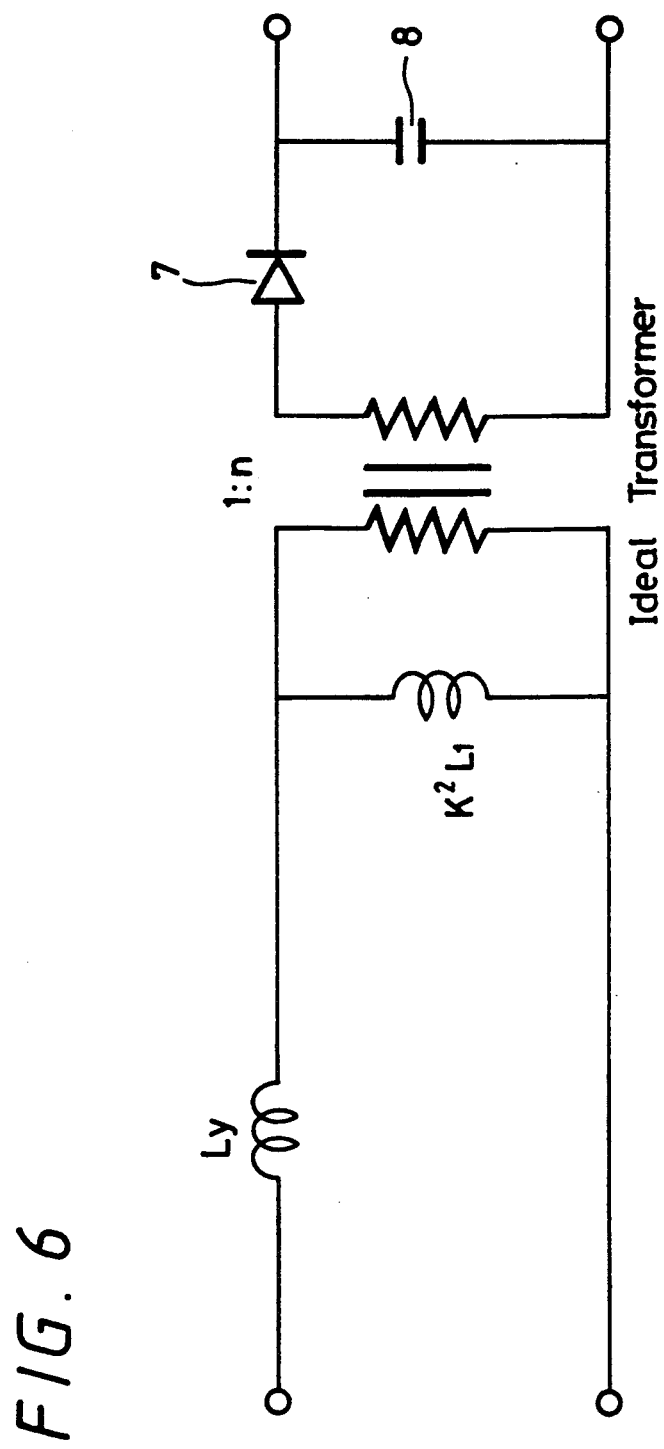
FIG. 6 is a diagram of a circuit which results from rewriting the equivalent circuit of FIG. 5.

An output voltage HV of the equivalent circuit shown in FIG. 5 is expressed by the following equation (1):

$$HV = VpMn/(Ly+M) - iR(Ly) \quad (1)$$

where Vp represents the height (height from zero level to peak level) of the input pulse, Ly represents an inductance component composed of the inserted inductance Lx, the leakage inductance $(1-k^2)L1$, the capacitor 5 and the switching circuit 12 as shown in FIG. 6 (FIG. 6 shows an equivalent circuit of the circuit of FIG. 5) and R(Ly) represents the output impedance determined by Ly.

Study of the equation (1) demonstrates that, if the inductance component Ly increases, then the high output voltage HV decreases. Conversely, if the inductance component Ly decreases, then the high output voltage HV increases. The fact that the duration of period in which the switching circuit 12 is in its on state is increased means that the inductance component Ly is decreased (output voltage is increased). Conversely, if the duration of period in which the switching circuit 12 is in its on state is reduced, then the inductance component Ly is increased (output voltage is decreased). Therefore, if the output voltage is detected and the time ratio between the on and off of the switching circuit 12 is changed in response to the detected voltage, then the fluctuation of the high voltage output can be suppressed.

Figure 7:
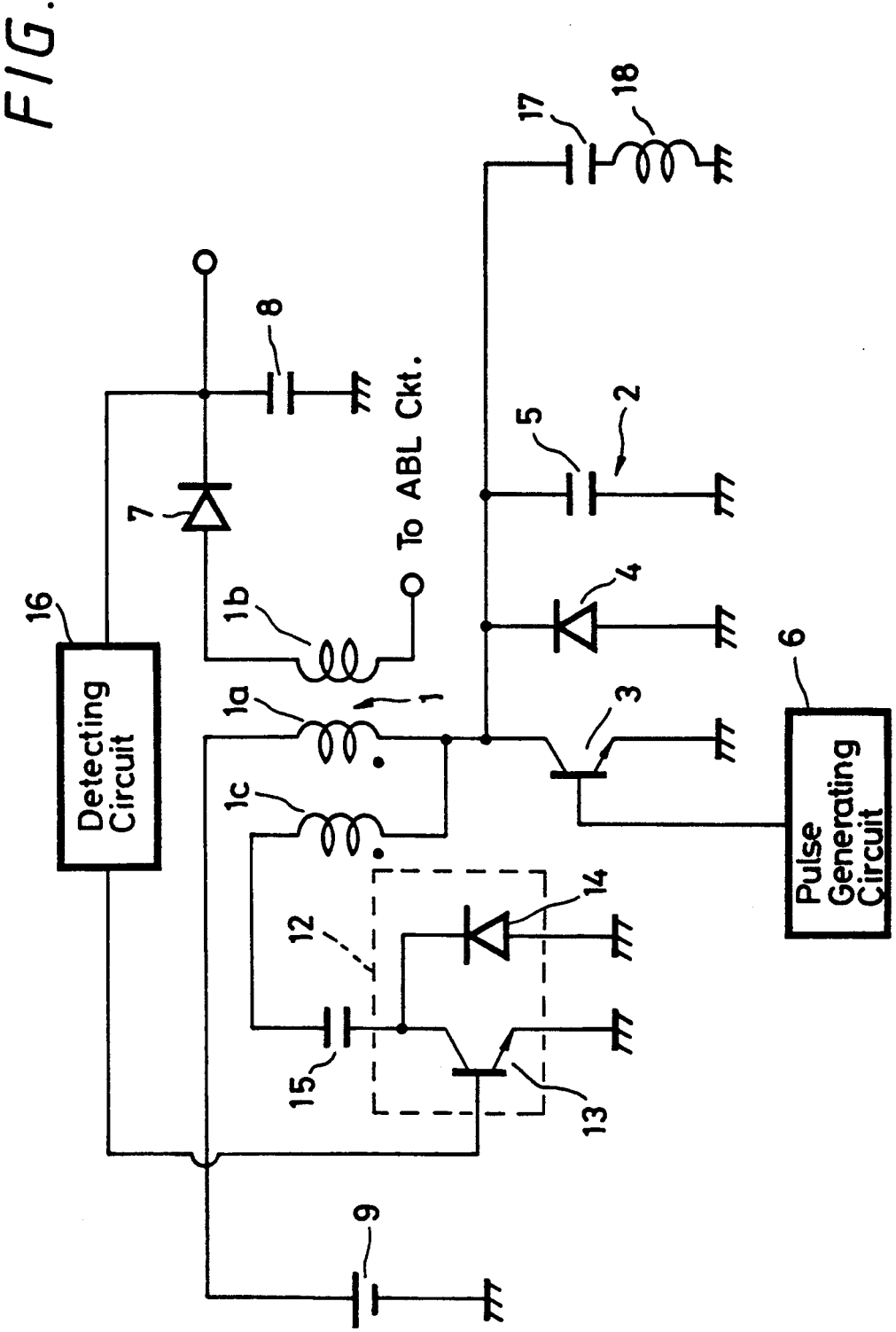
FIG. 7 is a diagram showing a circuitry of a second embodiment of a high voltage regulating circuit according to the present invention.

FIG. 7 shows a second embodiment of the present invention. While the external coil 11 is coupled to the primary winding 1a of the flyback transformer 1 in the first embodiment shown in FIG. 1, there are provided a plurality of primary windings (1a and 1c) in the second embodiment shown in FIG. 7, thereby the external coil 11 being omitted. However, one primary winding 1c is equivalently coupled to the primary winding 1a in series as will be described later. A rest of other arrangements is similar to that of FIG. 1.

Figure 8:
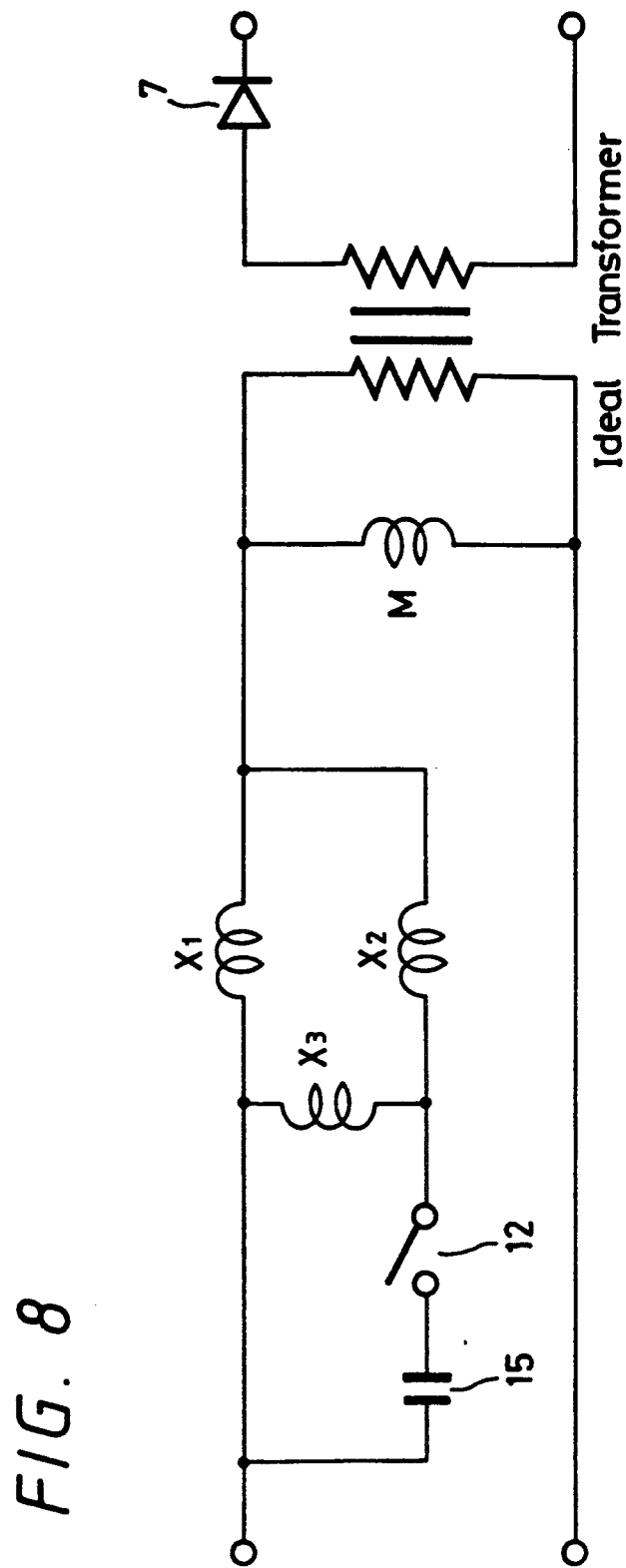
FIG. 8 is a diagram showing an equivalent circuit of a main portion of the second embodiment shown in FIG. 7.

More specifically, the second embodiment of FIG. 7 is expressed by an equivalent circuit shown in FIG. 8, which is substantially equivalent to the condition such that the inductance is coupled in series to the primary winding 1a of the flyback transformer 1. In FIG. 8, X1 depicts a leakage inductance between the primary coil 1a and the secondary coil 1b, X2 depicts a leakage inductance between the primary coil 1c and the secondary coil 1b and X3 depicts a leakage inductance between the primary coil 1a and the primary coil 1c.

Also in this case, under the control of the switching circuit 12, the high voltage output can be stabilized similarly to the first embodiment shown in FIG. 1.

Figure 9:
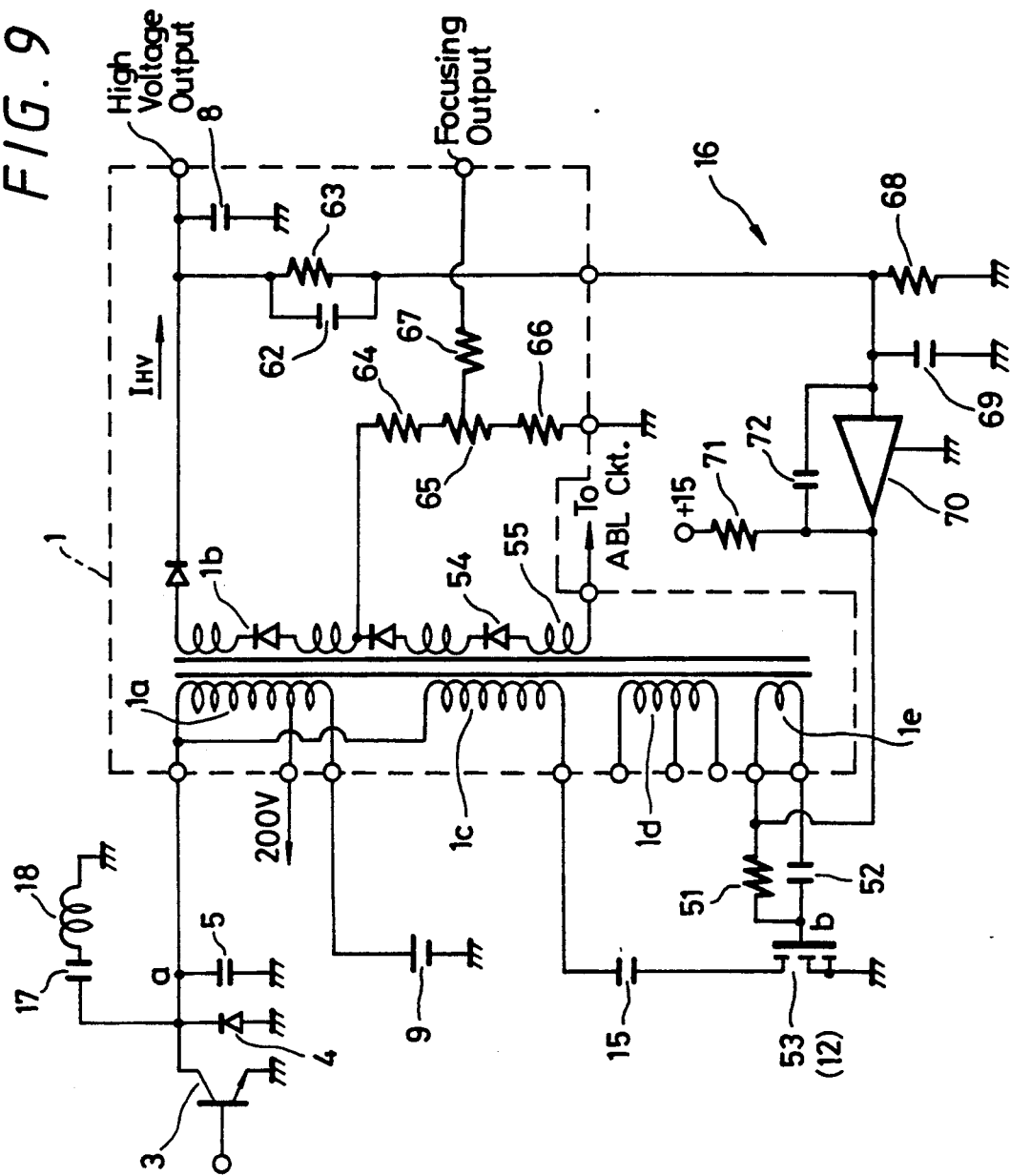
FIG. 9 is a diagram showing a circuitry of a third embodiment of a high voltage regulating circuit according to the present invention.

FIG. 9 shows a third embodiment of the present invention. In the third embodiment of the present invention, a plurality of tertiary windings 1d are provided in addition to the two primary windings 1a, 1c and the secondary winding 1b. Then, one of the tertiary windings 1d is employed as a pulse winding 1e. This pulse winding 1e is coupled to a differentiating circuit formed of a resistor 51 and a capacitor 52 whose output is coupled to the gate of a field effect transistor (FET) 53 serving as the switching circuit 12. Though not shown, the FET 53 includes a parasitic diode and this parasitic diode is operated as the diode 14 in the above-mentioned switching circuit 12.

Further, in the third embodiment of the present invention, the secondary winding 1b is formed by coupling a plurality of (4 stages in this embodiment) stages of coils 55 and diodes 54. The diodes 54 are collectively expressed as the diode 7 in FIGS. 1 and 7.

Furthermore, in the third embodiment of the present invention, the detector circuit 16 is composed of a resistor 68 which divides a high voltage output together with a high voltage resistor 63 and a high voltage capacitor 62, an integrating circuit formed of a capacitor 69, a resistor 71, a capacitor 72 and an operational amplifier 70, and the pulse winding 1e, the resistor 51 and the capacitor 52 mentioned above.

Resistors 64, 65 and 66 are connected to the intermediate tap of the secondary winding 1b in series. Of these resistors 64 to 66, the resistor 65 is served as a slide resistor and a voltage generated at a predetermined slide position of the slide resistor 65 is delivered through a resistor 67 as a focusing output.

FIG. 10 is a cross-sectional view illustrating the arrangements of the respective windings of the flyback transformer having the primary, secondary and tertiary windings.

As shown in FIG. 10, the primary windings 1a, 1c and the tertiary winding 1d are wound around a bobbin 91 and located close to a core 93. Whereas, the secondary winding 1b is wound around a bobbin 92 and located at the circumference outside the primary windings 1a, 1c. A terminal pin 94 is implanted on the bobbin 91.

Operation of the third embodiment shown in FIG. 10 will be described with reference to FIGS. 11A through 11C.

Figure 11A:
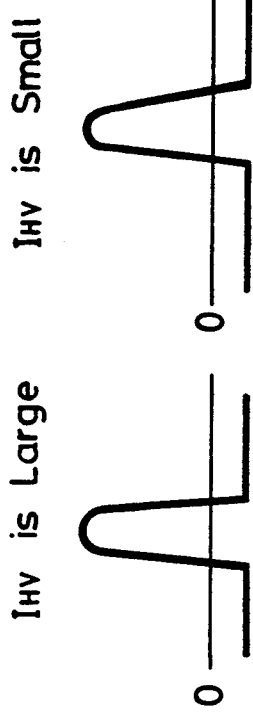
FIGS. 11A through 11C are respectively waveform diagrams used to explain operation of the third embodiment of FIG. 9.

A horizontal deflection pulse shown in FIG. 11A is generated in the collector of the NPN transistor 3 in response to the on and off states of the NPN transistor 3 similarly as described above. Consequently, a horizontal deflection current of a sawtooth waveform is flowed through the horizontal deflection coil 18. Also, this horizontal deflection pulse is applied to the primary windings 1a, 1c with the result that a high voltage is generated across the secondary winding 1b. This high voltage is rectified, smoothed and output by the diodes 54 (7) and the capacitor 8.

The high voltage is divided by the resistors 63 and 68, smoothed by the capacitor 69, integrated by the integrating circuit including the operational amplifier 70 and applied through the resistor 51 to the gate of the FET 53. Whereas, a pulse corresponding to the horizontal deflection pulse is detected by the pulse winding 1e, the resultant detected output is differentiated by the differentiating circuit formed of the resistor 51 and the capacitor 52 and then is applied to the gate of the FET 53. As a result, voltages shown in FIG. 11B are applied to the FET 53.

Figure 11B:
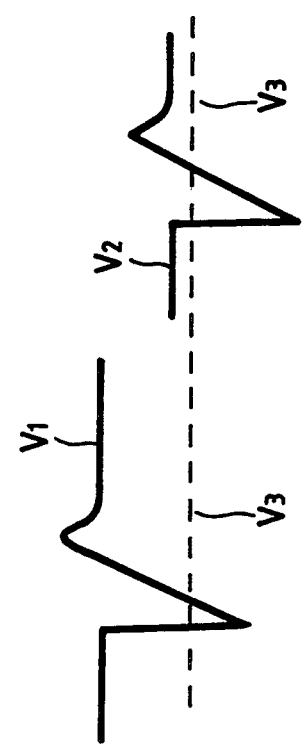
Figure 11C:
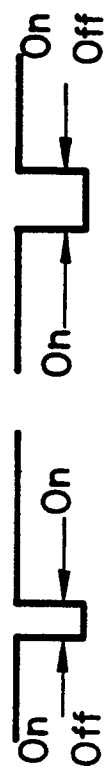

More specifically, when the level of the high output voltage is high, as shown on the lefthand side of FIG. 11B, a difference between the voltage V1 corresponding to the high voltage output and a threshold level voltage V3, which turns on the FET 53, is increased. As a result, a duration of period in which the FET 53 is in its off state (duration of period in which a voltage generated at the timing at which the pulse winding 1e outputs the detected voltage becomes smaller than the reference voltage V3) is reduced. Therefore, the duration of period in which the FET 53 is set in its off state is reduced as shown on the lefthand side of FIG. 11C.

On the other hand, when the level of the high output voltage is small, as shown on the righthand side of FIG. 11B, the voltage V2 applied to the FET 53 in a DC fashion is decreased and a difference between it and the threshold voltage V3 is reduced, thereby extending the duration of period in which a voltage generated at the timing at which the pulse winding 1e detects the pulse becomes smaller than the reference voltage V3. As a consequence, the duration of period in which the FET 53 is set in its off state is extended as shown on the righthand side of FIG. 11C.

As set out above, when the high output voltage is increased, the duration of period in which the FET 53 is in its off state is reduced, while when the high voltage output is decreased, the duration of period in which the FET 53 is in its off state is extended, to thereby effect the servo so that the high voltage output becomes constant.

Figure 12A:
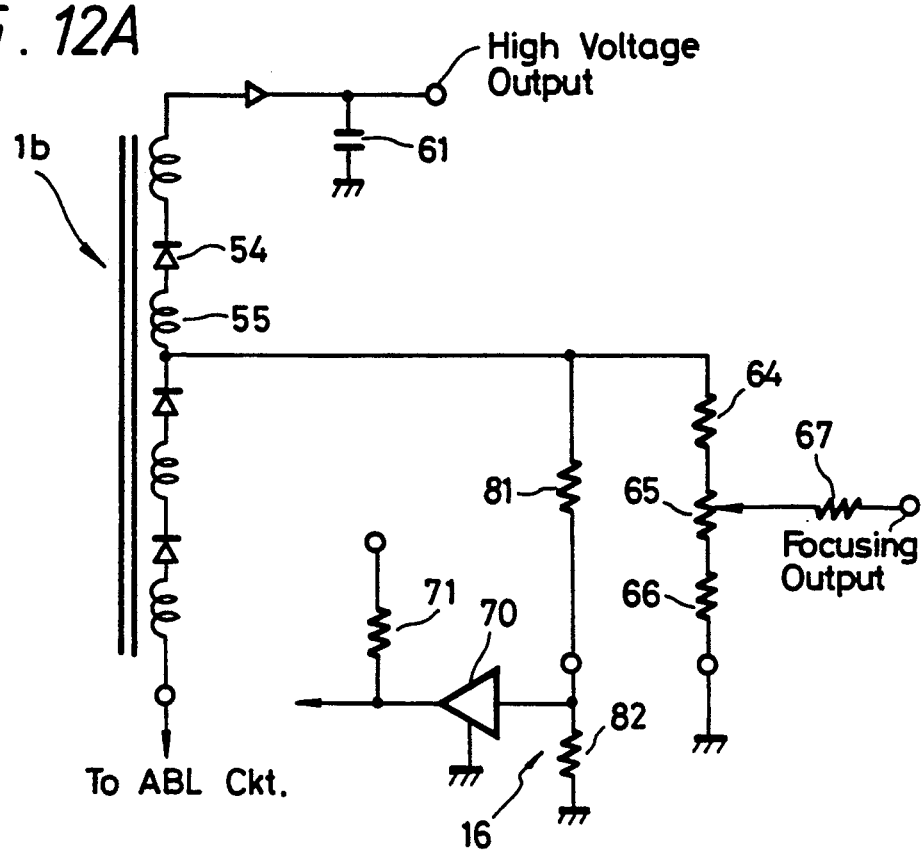
FIGS. 12A and 12B are respectively diagrams showing arrangements of other embodiments of the high voltage output detecting circuit used in the third embodiment of FIG. 9.
Figure 12B:
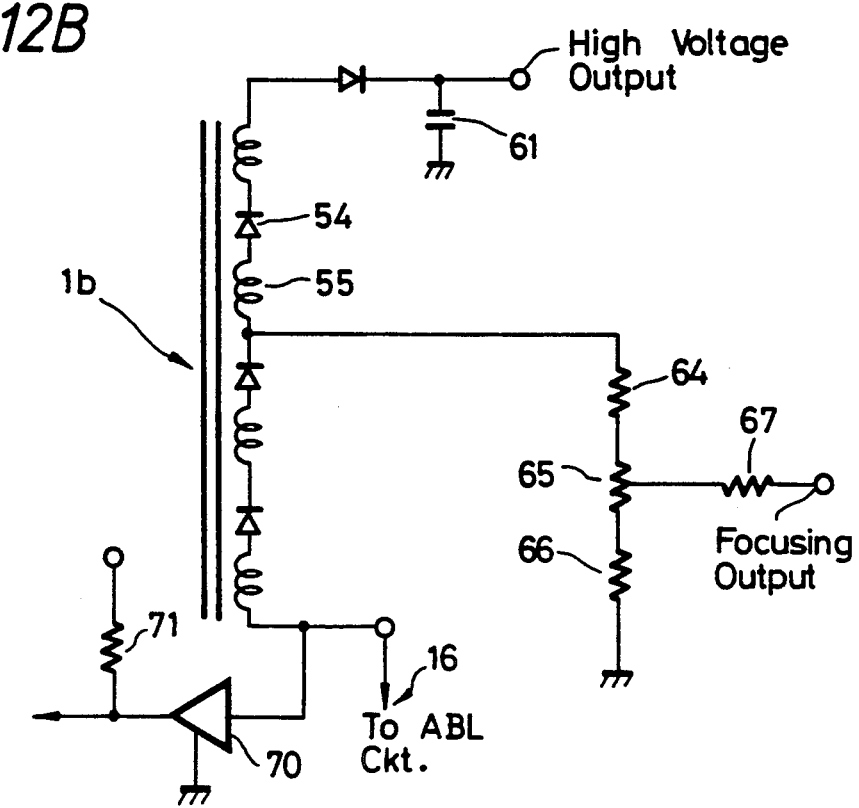

FIGS. 12A and 12B of the accompanying drawings show other embodiments of the circuit for detecting the high voltage output of the present invention.

In the embodiment shown in FIG. 12A, a voltage at the tap for obtaining the focusing output of the secondary winding 1b is divided by resistors 81, 82 and the voltage thus divided is supplied to the operational amplifier 70.

In the embodiment shown in FIG. 12B, a voltage developed at a terminal coupled to the ABL circuit (not shown) is supplied to the operational amplifier 70. In the ABL circuit, resistors are internally connected in order to detect the voltage corresponding to the high voltage output current. Accordingly, the operational amplifier 70 is applied with the same voltage as the voltage detected in this ABL circuit.

As described above, according to the high voltage regulating circuit of the present invention, since the condition that the inductance is substantially inserted into the primary winding of the flyback transformer in series and the condition such that the inductance is not inserted thereinto are switched, the high voltage regulating circuit of the present invention can be simplified, made inexpensive and can stabilize the high voltage output. Further, the high voltage regulating circuit of the present invention exerts less influence on the deflection circuit and hence, the high voltage regulating circuit need not be formed as the separate system (or as substantially the same as the separate system). Furthermore, according to the present invention, the focusing voltage can be derived from the secondary winding of the flyback transformer. In addition, the fluctuation of the voltage in the tertiary winding is small.

Having described preferred embodiments of the invention with reference to the accompanying drawings, it is to be understood that the invention is not limited to those precise embodiments and that various changes and modifications may be effected therein by one skilled in the art without departing from the spirit or scope of the novel concepts of the invention as defined in the appended claims.

What is claimed is:

1. A high voltage regulating circuit comprising:
   a flyback transformer circuit for generating a high voltage at its secondary winding that corresponds to a voltage input to its primary winding;
   an inductance connected to said primary winding of said flyback transformer circuit in series;
   a series circuit formed of a capacitor and a switching element and connected in parallel to said inductance; and
   a detecting circuit for detecting said high voltage from said secondary winding, said switching element being switched by an output from said detecting circuit.

2. The high voltage regulating circuit according to claim 1, further comprising a diode in series with said secondary winding for rectifying the high voltage from said secondary winding and a capacitor in series with said diode for smoothing an output from said diode.

3. The high voltage regulating circuit according to claim 1, further comprising a switching circuit and a pulse generating circuit, an output from said switching circuit being supplied to said primary winding of said flyback transformer circuit, said switching circuit being responsive to an output from said pulse generating circuit.

4. The high voltage regulating circuit as claimed in claim 1, in which said flyback transformer circuit includes a plurality of primary windings, one of said plurality of primary windings serving as said inductance.

5. The high voltage regulating circuit as claimed in claim 4, in which said flyback transformer circuit comprises a plurality of tertiary windings and a differentiating circuit.

6. The high voltage regulating circuit as claimed in claim 5, in which one of said tertiary windings is used as a pulse winding whose output is supplied to said switching element.

7. The high voltage regulating circuit as claimed in claim 5, in which said secondary winding is formed of a plurality of stages of a coil and a diode.

8. The high voltage regulating circuit as claimed in claim 6, in which said detecting circuit is formed of a resistor for dividing the high voltage together with a high voltage resistor and a high voltage capacitor, an integrating circuit comprised of capacitors, a resistor and an operational amplifier, and said pulse winding.

9. The high voltage regulating circuit as claimed in claim 8, in which said detecting circuit further comprising a resistor and a capacitor.

* * * * *